June 4, 1974  T. M. LARKIN  3,814,628
BATTERY PASTE PUMPING AND METERING SYSTEM
Filed April 17, 1972  2 Sheets-Sheet 1

3,814,628
BATTERY PASTE PUMPING AND
METERING SYSTEM
Terrance M. Larkin, Littleton, Colo., assignor to The
Gates Rubber Company, Denver, Colo.
Filed Apr. 17, 1972, Ser. No. 244,485
Int. Cl. B44c 1/18; H01m 35/00
U.S. Cl. 117—201                                7 Claims

ABSTRACT OF THE DISCLOSURE

A closed loop pumping and metering system for pasting battery electrode plates with a viscous, thixotropic battery paste is disclosed. The closed loop includes an inlet for charging make-up paste, a first pump for agitating and circulating the paste around the loop, and a metering pump downstream of the circulating pump for initiating flow of a predetermined volumetric flow rate of paste through a discharge means onto a battery grid substrate, or the like. The paste consistency and working life are enhanced by the mixing effect provided by repeated passes through the circulating and metering pumps.

BACKGROUND OF THE INVENTION

This invention relates to systems for pasting battery plates, and particularly to such systems which are required to handle highly viscous, thixotropic, slurry-like suspensions of discrete crystalline finely divided particles.

In the assembly production of pasted battery plates, it has been common to pump the paste through a discharge means, such as a nozzle, with an open feed gear pump onto a moving grid, expanded mesh, or other type of conductive substrate. In such a system, it has been a common characteristic for a non-uniform volumetric flow rate of paste to be discharged upon the moving substrate, requiring the use of doctor blades or other means to scrape off the excess paste. This often results in the waste of paste, the non-uniform deposition of paste, and in the case where the substrate is of a non-rigid character the deformation or flattening of the soft substrate by the doctor blade. These drawbacks are magnified when the paste is highly viscous, thixotropic, and resembles a slurry or suspension of fine solid particles in a vehicle. Such paste may rheologically resemble "quick clays," wet mortar, cement, or the like. The finely divided particles of solids are generally macromolecular in size, rather than colloidal. These paste materials are essentially non-plastic and behave like non-Newtonian fluids insomuch as the viscosity of the paste varies with its rate of flow in the closed loop network. As such, significant problems are encountered in circulating and metering a predetermined amount of the paste at a given flow rate onto a passing substrate and in avoiding "setting up" of the paste.

Traditional systems for circulating common thixotropic types of materials, such as shown in U.S. Pat. No. 2,651,586 (Cooper et al.) employ a circulating pump in series with a type of constant pressure aided three-way valve for intermittent metering of the material. Such a valve type of metering device has been tested and found to be ineffective for discharging at a predetermined flow rate highly viscous, non-Newtonian fluids such as contemplated by the present invention. The general state of the art is also exemplified by the teachings of U.S. Pats. Nos. 2,479,603 (Chubb et al.), 2,972,546 (Adler et al.), and 3,529,626 (German).

SUMMARY OF THE INVENTION

Briefly, the present invention includes a system and process for metering viscous, thixotropic electrochemically active paste onto a suitable electrode substrate. The system comprises a closed loop conduit system connecting a circulating pump, fed through an inlet reservoir, with a pumping/metering device for initiating flow of a portion of the circulating paste and for metering a predetermined volumetric flow rate of the paste to a discharge nozzle, or the like. Paste consistency and working life are enhanced by the mixing effect of repeated passes of the paste through the pumps in the closed loop system. By discharging a substantially constant flow rate of paste, the speed of the traveling substrate may be chosen so that uniform pasting of the grid is effected without waste of paste and without the use of doctor blades or other controlling devices.

BRIEF DESCRIPTION OF THE DRAWINGS

The invention will be more particularly set forth in various of its embodiments by reference to the accompanying drawings, in which.

PREFERRED EMBODIMENTS OF THE INVENTION

Figure 1:
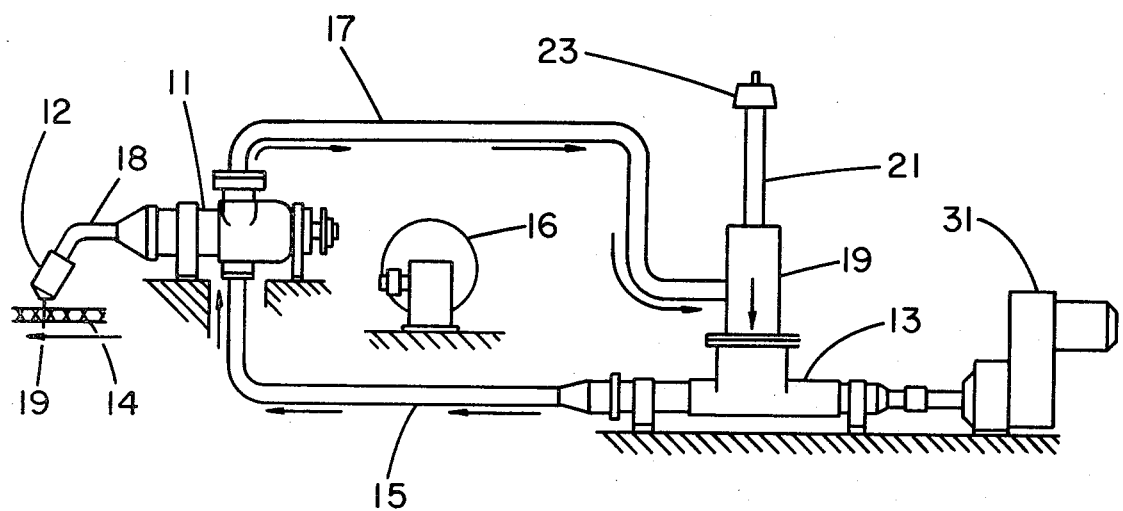
FIG. 1 is a flow diagram of the overall paste pumping and metering system of the invention.

Referring to FIG. 1, a closed loop pumping, circulating, and battery paste metering system generally includes a circulating pump 13 and metering pump 11 connected through forward conduit 15 and return conduit 17. Battery paste is charged to the closed loop through an inlet means such as reservoir 19 provided with a biasing means for applying a net positive suction head to the circulating pump 13, and discharged through conduit 17 and nozzle 12 onto electrode substrate 14. This biasing means at the inlet side may be selected from a number of suitable devices well known and appreciated by those skilled in the art. Examples include piston ram 21 provided with a weight 23, a spring, dead weight, fluid pressure head or rolling diaphragm membrane. The biasing means preferably isolates the battery paste from exposure to the atmosphere to preclude possible degradation.

The rheological nature of the battery paste circulated within the system has been described hereinabove as being highly viscous, thixotropic and exhibiting non-Newtonian character. While viscosity measurements on a Brookfield viscosimeter of the battery paste are not too meaningful for non-Newtonian fluids, apparent viscosity readings of typical battery paste compositions of the invention will often be at least about 3 million centipoises, and quite often greater than about 7 million centipoises.[1] Examples of such paste compositions include negative and positive lead-acid battery pastes which comprise a major proportion of oxides of lead, e.g. litharge, suspended in a minor proportion of a vehicle, e.g. water. The litharge particles preferably are discrete crystalline finely divided solids of a ceramic nature of macroscopic size. Oftentimes additional paste constituents, such as an expander, lead and $Pb_3O_4$ are present. It is preferred that the battery paste contain no entrained fluids which may have the effect of degrading the paste by oxidation or other mechanism.

[1] Measured with a TF helipath spindle at 1 r.p.m. after at least one and up to fifty minutes elapsed time.

Figure 2:
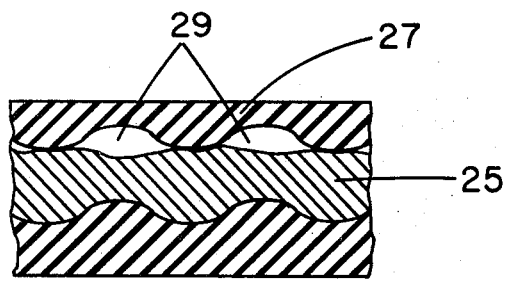
FIG. 2 shows a fragmentary partial sectional view of the forward portion of a preferred type of positive displacement pump denoted either as pump 11 or pump 13 of FIG. 1.
Figure 3:
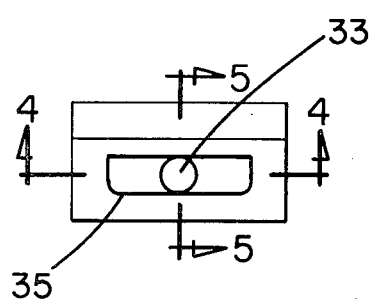
FIG. 3 is an end view at the outlet of a discharge nozzle useful in the invention.
Figure 4:
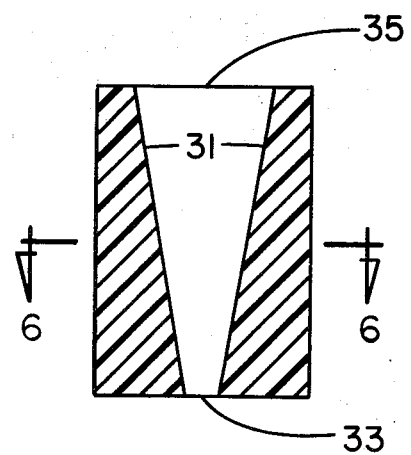
FIGS. 4, 5, and 6 are different sectional views of the nozzle of FIG. 3 taken along the designated sections.
Figure 5:
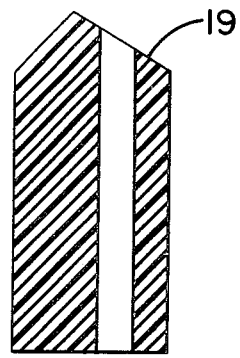
Figure 6:
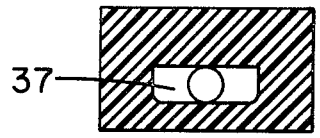
Figure 7:
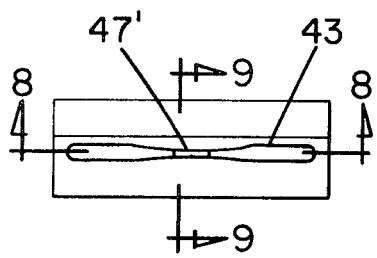
FIG. 7 is an end view at the outlet of another type of nozzle useful in the present invention.

In order to circulate such cement-like pastes about a closed loop, circulating pump 13 is preferably of the positive displacement type, exemplified by a diaphragm pump or Archimedes' screw type pump. This latter type of pump (preferred for lead-acid pastes) is exemplified by the Moyno pumps (a registered trademark of the Robbins and Myers Corporation) utilizing a progressing cavity arrangement as shown partially in FIG. 2. The operating principle of the pump is based on the two pumping elements consisting of a helical rotor 25 turning within a double threaded helical stator 27. The meshing helical surfaces push the battery paste ahead along the progressing cavities 29 with uniform movement and low turbulence similar to a slow moving piston in a cylinder of infinite length. The screw-like rotor rolls within the nut-like stator with an eccentric rolling movement. The speed of the rotor 25 and hence the rate of flow of the paste within the closed loop may be varied according to the output speed of a variable spaced drive pump motor 31.

It has been found that in order to achieve uniform deposition of battery paste from the nozzle 12 onto a suitable electrode substrate 14, such as an expanded mesh grid or perforated sheet, more than just a passive mechanism (e.g. a three-way valve) is required to meter a predetermined volumetric flow rate of paste to the discharge nozzle 12. A three-way valve has been found to be ineffective insomuch as the valve is incapable of diverting and initiating flow of a particular desired portion of the circulating paste away from the closed loop without eventual plugging, channeling and stoppage. In order to divert and initiate flow of the desired amount of paste away from the circulating loop represented in part by conduit 15 and 17, a positive displacement metering pump 11 is required. This pump may suitably be driven by a motor 16 whose speed is preferably directly proportional to the speed of the battery substrate material 14 as it passes beneath and in close proximity to the discharge nozzle 12. This positive displacement metering pump 11 may be of various types although the Archimedes' screw type, exemplified by the aforementioned Moyno type, is preferred. By varying the speed of the rotor within the pump by means of motor 16, the volumetric flow rate of paste to the discharge means 12 may be controlled within any desired range. This capability holds virtually independent of temperature and the internal pressure of the paste exerted within the closed loop, provided a net positive suction head exists at the pump inlet and the pump has not cavitated.

Because paste consistency and working life are enhanced by the mixing of paste provided by repeated passes through the pump 11 and 13, the relative speeds of the two pumps are chosen so that only a desired proportion of the circulating paste is diverted to the discharge means 12. Normally, the ratio of the amount of paste allowed to recirculate in the closed loop to the amount of paste material metered to the discharge means is preferably from about 50:1 to about 15:1, and more preferably from about 30:1 to about 20:1.

The discharge means 12 is preferably in the configuration of a nozzle whose geometry is designed to accommodate substantially unobstructed flow of the viscous, thixotropic paste. One embodiment of the discharge means includes a depending nozzle 12 which conducts fluid from the metering pump 11 through curved conduit 18. The head of the nozzle 12 preferably has a tapered surface 19 which is arranged substantially parallel to the moving substrate material 14. In the instance where the substrate material is of a soft and deformable nature (e.g. high purity expanded lead mesh) it is preferred to position the surface 19 slightly above the moving substrate. In this manner, the nozzle acts similarly in function to a doctor blade without deforming the substrate 14. Those skilled in the art will appreciate the use of other discharge means suitable for applying the paste onto an electrode substrate.

Preferred nozzle configurations are those which convert a substantially cylindrical input flow from the positive displacement pump to a ribbon-like rectangular output for application to the substrate. Because of the rheology of the paste composition, traditional nozzle structures have not been found workable insomuch as the paste has tended to cling to the interior surfaces of the nozzle, allowing the paste to be discharged only through the central portions of the nozzle, a phenomenon commonly known as "channeling."

It has been found that that two types of nozzle configurations can effectively accommodate such a viscous non-Newtonian fluid after hours of continuous use without significant channeling. The first type is depicted in FIGS. 3–6 in which substantially straight nozzle sides 31 are employed in the transition from the cylindrical or circular input 33 to the substantially rectangular output 35. In this first embodiment having straight sides 31, it is important that the cross-sectional area of the interior of the nozzle, such as noted by the reference numeral 37 in FIG. 6, increases essentially monotonically from the inlet point 33 to the outlet point 35.

Figure 8:
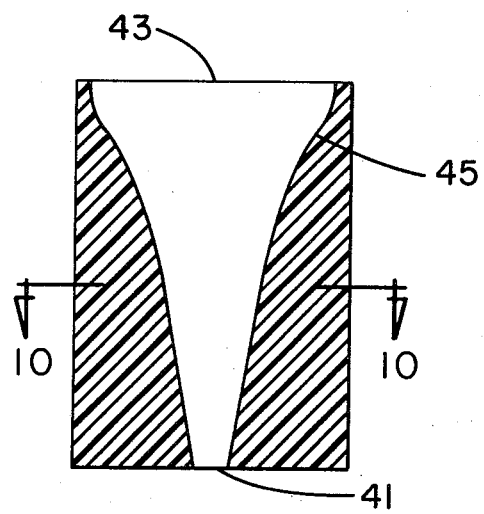
FIGS. 8, 9 and 10 depict various sectional views of the nozzle of FIG. 7 taken along the sections as shown.
Figure 9:
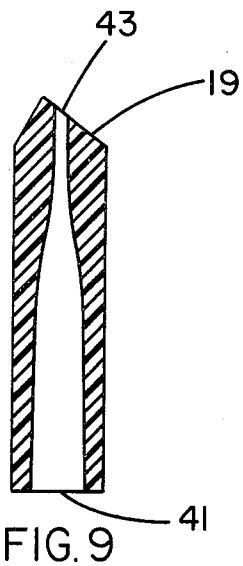
Figure 10:
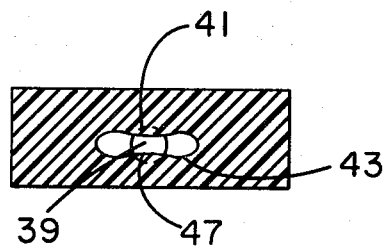

The second type of nozzle configuration is shown in FIGS. 7–10 and employs a constant or substantially constant cross-sectional area as a progression is made from the cylindrical inlet 41 to the rectangular-like outlet 43. To maintain such a substantially constant cross-sectional area, it is important that the internal fluid flow surfaces 45 of the nozzle as shown in FIG. 8 be substantially diverted or curved outwardly, apparently to minimize boundary frictional force which seem to predominate over internal paste shear forces. Preferably this curved surface 45 is a portion of or substantially resembles a portion of one of the conic sections, as viewed perpendicularly to the direction of fluid flow and to the length of rectangle-like surface 43. It is also preferred that while progressing from the inlet point 41 to the outlet point 43 that cross-sectional area 39 contains inwardly curved depressions 47 to further inhibit boundary frictional problems which might lead to channeling. The outlet slit 43 also preferably contains centrally located slight depressions 47' to prevent channeling. It is believed that those skilled in the art will appreciate additional nozzle configurations useful and within the scope of the present invention.

While various materials and constructions of nozzles may be employed, machined or cast thermosetting polymeric materials such as cast epoxy or polyester resins or machined acrylic have been found suitable.

It should be understood that the invention is capable of a variety of modifications and variations which will become apparent to those skilled in the art upon reading of the specification. Such modifications are intended to be encompassed within the scope of the invention as defined by the appended claims. For instance, while the description and drawings depict a stationary discharge means and a moving electrode substrate, clearly the reverse roles could be taken and still maintain the desired relative movement.

What is claimed is:

1. A process of uniformly distributing viscous thixotropic battery paste onto an electrode plate substrate comprising:
   (a) continually pumping and circulating the battery paste with first pump means through a substantially closed loop conduit system provided with inlet means and discharge means;
   (b) diverting the flow of a portion of said circulating paste away from said closed loop conduit with the aid of second pump means; and
   (c) metering the diverted paste with said second pump means at a substantially constant volumetric flow rate through said discharge means to thereby apply the diverted paste upon said electrode plate substrate.

2. The process of claim 1 wherein said discharge means has a substantially circular cross-section at its input side and a substantially rectangular or slit-like cross-section at its output side.

3. The process of claim 1 wherein the process further comprises the step of:
(d) moving said electrode plate substrate beneath and in close proximity to said discharge means at a speed directly proportional to the speed of said second pump means.

4. The process of claim 3 wherein said electrode plate substrate is a soft, deformable substrate.

5. The process of claim 1 wherein the thixotropic battery paste is a lead-based paste having an apparent Brookfield viscosity of at least 3 million centipoises.

6. The process of claim 1 wherein said second pump means is of the positive displacement type.

7. The process of claim 1 wherein the ratio of the amount of paste allowed to recirculate in the closed loop to the amount of paste material diverted from the closed loop is in the range from about 50:1 to about 15:1.

References Cited

UNITED STATES PATENTS

| 3,610,201 | 10/1971 | Meyer | 118—410 |
| 2,713,078 | 7/1955 | Gros | 136—19 |
| 2,599,604 | 3/1943 | Bauer | 117—44 |
| 2,313,750 | 6/1952 | Hothersall | 117—43 |

FOREIGN PATENTS

| 624,255 | 6/1949 | Great Britain | 136—19 |
| 608,576 | 9/1948 | Great Britain | 239—127 |

LEON D. ROSDOL, Primary Examiner

M F. ESPOSITO, Assistant Examiner

U.S. Cl. X.R.

118—410; 136—19; 239—127

UNITED STATES PATENT OFFICE
CERTIFICATE OF CORRECTION

Patent No. 3,814,628          Dated June 4, 1974

Inventor(s) Terrance M. Larkin

It is certified that error appears in the above-identified patent and that said Letters Patent are hereby corrected as shown below:

In column 3, line 19, the word "spaced" should be deleted and the word -- speed -- should be substituted therefor.

Signed and sealed this 11th day of February 1975.

(SEAL)
Attest:

RUTH C. MASON
Attesting Officer

C. MARSHALL DANN
Commissioner of Patents
and Trademarks